(12) United States Patent
Zysman et al.

(10) Patent No.: US 8,490,382 B2
(45) Date of Patent: Jul. 23, 2013

(54) MODULATING FLOW THROUGH GAS TURBINE ENGINE COOLING SYSTEM

(75) Inventors: Steven H. Zysman, Amston, CT (US); Gregory A. Kohlenberg, Meriden, CT (US)

(73) Assignee: United Technologies Corporation, Hartford, CT (US)

( * ) Notice: Subject to any disclaimer, the term of this patent is extended or adjusted under 35 U.S.C. 154(b) by 1088 days.

(21) Appl. No.: 12/439,733

(22) PCT Filed: Oct. 12, 2006

(86) PCT No.: PCT/US2006/039804
§ 371 (c)(1),
(2), (4) Date: Mar. 3, 2009

(87) PCT Pub. No.: WO2008/045054
PCT Pub. Date: Apr. 17, 2008

(65) Prior Publication Data
US 2010/0180571 A1    Jul. 22, 2010

(51) Int. Cl.
*F02K 3/02* (2006.01)
*F02K 5/02* (2006.01)

(52) U.S. Cl.
USPC ............... 60/226.3; 60/204; 60/248; 60/262

(58) Field of Classification Search
USPC ............... 60/204, 226.3, 248, 262, 770, 771
See application file for complete search history.

(56) References Cited

U.S. PATENT DOCUMENTS

| 3,477,230 | A | | 11/1969 | Bauger et al. |
| 4,068,469 | A | * | 1/1978 | Adamson ................... 60/204 |
| 5,269,135 | A | | 12/1993 | Vermejan et al. |
| 5,553,449 | A | * | 9/1996 | Rodgers et al. ............. 60/204 |
| 6,058,696 | A | * | 5/2000 | Nikkanen et al. .......... 60/226.1 |
| 6,106,229 | A | | 8/2000 | Nikkanen et al. |
| 7,107,756 | B2 | * | 9/2006 | Rolt ........................... 60/224 |
| 7,823,389 | B2 | * | 11/2010 | Seitzer et al. ............... 60/782 |
| 2004/0154283 | A1 | | 8/2004 | Rey et al. |

FOREIGN PATENT DOCUMENTS

| EP | 0924409 A2 | 6/1999 |
| EP | 1669551 A2 | 6/2006 |
| FR | 2400618 A | 3/1979 |

OTHER PUBLICATIONS

Search Report and Written Opinion mailed on Oct. 12, 2006 for PCT/US2006/039804.
Notification of Transmittal of the International Preliminary Report on Patentability for PCT/US2006/039804.

* cited by examiner

*Primary Examiner* — Ehud Gartenberg
*Assistant Examiner* — Arun Goyal
(74) *Attorney, Agent, or Firm* — Carlson, Gaskey & Olds, P.C.

(57) ABSTRACT

A gas turbine engine system includes a fan bypass passage in a cooling passage having an inlet that receives a bleed flow from the fan bypass passage and an outlet that discharges the bleed flow into the fan bypass passage. A nozzle having a variable cross-sectional area controls an airflow within the fan bypass passage. The bleed flow outlet is placed such that moving the nozzle to change the variable cross-sectional area controls an amount of the bleed flow through the cooling passage.

21 Claims, 2 Drawing Sheets

MODULATING FLOW THROUGH GAS TURBINE ENGINE COOLING SYSTEM

BACKGROUND OF THE INVENTION

This invention relates to engines and, more particularly, to a gas turbine engine having a variable area exhaust nozzle for controlling flow through a cooling passage associated with the gas turbine engine.

Gas turbine engines are widely known and used for power generation and vehicle (e.g., aircraft) propulsion. A typical gas turbine engine includes a compression section, a combustion section, and a turbine section that utilize a primary airflow into the engine to generate power or propel the vehicle. The gas turbine engine is typically mounted within a housing, such as a nacelle. A bypass airflow The temperature of the bypass airflow is relatively cool compared to the engine and is used as an engine cooling source. For example, a portion of the bypass airflow is bled at an upstream location into a cooling passage within the engine compartment and used to absorb heat from engine components. The cooling passage discharges the bleed flow at a downstream location back into the bypass airflow. Although effective for cooling, the bleed flow is generally unregulated and penalizes bypass airflow thrust efficiency by imparting pressure loss to the cooling air. New jet engine technology with geared systems, and aircraft with increasing electrical systems (replacing pneumatic systems) require significantly increased cooling requirements. Thus, there is a need for a method and system controlling the bleed flow to increase engine efficiency.

SUMMARY OF THE INVENTION

An example gas turbine engine system includes a fan bypass passage and a cooling passage. The cooling passage includes an inlet that receives a bleed flow from the fan bypass passage and an outlet for discharging the bleed flow back into the fan bypass passage. A nozzle having a variable cross-sectional area is selectively moved to change the variable cross-sectional area to increase fan efficiency and operability. As a consequence, and by skillful placement of the bleed duct discharge, bleed flow through the cooling passage is also controlled.

An example method of controlling a gas turbine engine system includes the selective location of a cooling passage discharge relative to a variable area exhaust nozzle to change an amount of a bleed flow through the cooling passage.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
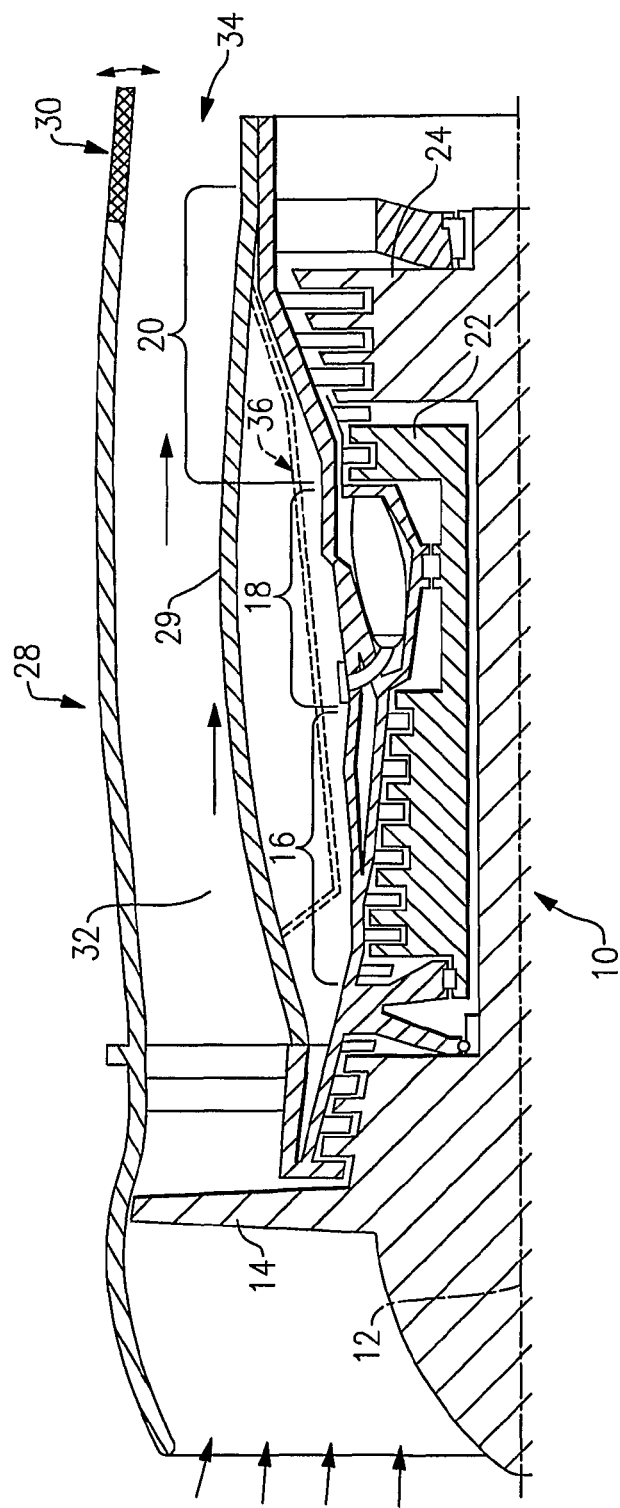
FIG. 1 illustrates selected portions of an example gas turbine engine system.

FIG. 1 illustrates a simplified view of selected portions of an example gas turbine engine 10, such as a gas turbine engine used for propulsion, circumferentially disposed about an engine centerline, or axial centerline axis 12. FIG. 1 is a schematic representation, for illustrative purposes only, and is not a limitation on the instant invention. The gas turbine engine 10 includes a fan 14, a compressor 16, a combustion section 18, and a turbine section 20. As is well known in the art, air compressed in the compressor 16 is mixed with fuel that is burned in the combustion section 18 and expanded in turbine section 20. The air compressed in the compressor and the fuel mixture expanded in the turbine section 20 can both be referred to as a hot gas stream flow. The turbine section 20 includes rotors 22 and 24 that, in response to the expansion, rotate to drive the fan 14 and compressor 16.

A nacelle 28 extends circumferentially about the gas turbine engine 10. In this example, the nacelle 28 includes a variable area exhaust nozzle 30. A fan bypass passage 32 extends between the nacelle 28 and an inner flow surface 29. In operation, the fan 14 draws air into the bypass passage 32 and discharges the air out of a rear exhaust 34. In this example, a cooling passage 36 (schematically shown) extending between the engine 10 and nacelle 28 receives relatively cool air from the bypass passage 32 to cool the gas turbine engine 10.

Figure 2:
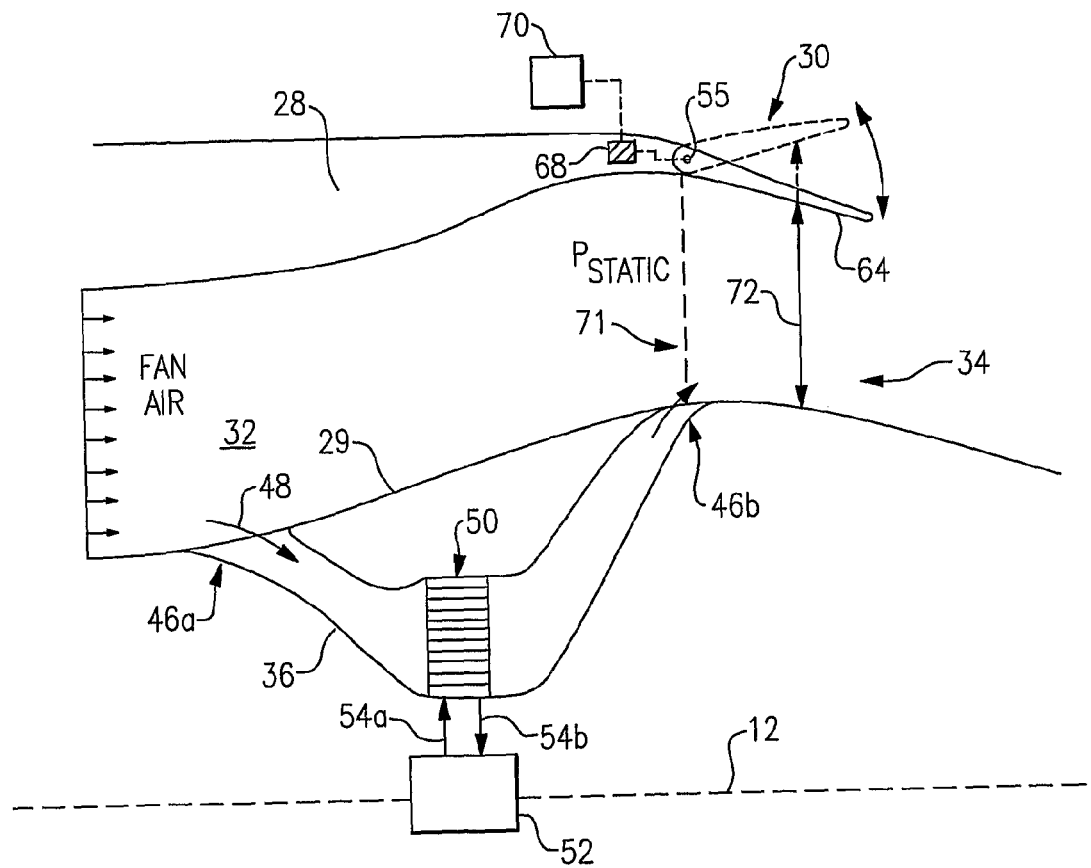
FIG. 2 illustrates a variable area exhaust nozzle and coolant passage within the gas turbine engine system shown in FIG. 1.

FIG. 2 illustrates an example embodiment of the cooling passage 36. In this example, the cooling passage 36 includes an inlet 46a and an outlet 46b located downstream from the inlet 46a. A portion of the airflow through the bypass passage 32 bleeds into the cooling passage 36 as a bleed flow 48. In one example, up to 2% of the airflow through the bypass passage 32 bleeds as bleed flow 48. The bleed flow 48 flows through the cooling passage 36 and is discharged out of the outlet 46b into the bypass passage 32. The temperature of the bleed flow 48 is generally cooler than the temperature of components and systems within a gas turbine engine 10 and is used to cool the gas turbine engine 10 or a portion thereof.

In this example, a heat exchanger 50 (e.g., tube and fin or other type of heat exchanger) is disposed within the cooling passage 36 to facilitate cooling. A fluid, such as oil or other heat transfer fluid, circulates between the heat exchanger 50 and a gas turbine engine component 52. The oil absorbs heat from the gas turbine engine component 52, and the bleed flow 48 absorbs heat from the oil to transfer the heat away from the gas turbine engine component 52. In the illustrated example, the oil flows into the heat exchanger 50 through an inlet circuit 54a. The relatively cool bleed flow 48 flows through the heat exchanger 50 and absorbs heat from the oil before the oil returns through outlet circuit 54b to the gas turbine engine component 52. In one example, the gas turbine engine component 52 is a fan drive gearbox. In another example, the gas turbine engine component 52 includes an electric generator. Given this description, one of ordinary skill in the art will recognize additional or alternative engine components for cooling using the bleed flow 48.

In this example, the variable area exhaust nozzle 30 includes a flap 64 that is pivotable about a hinge 55. Although only a single flap is shown in this figure, multiple flaps 64 may be used about the circumference of the rear exhaust 34. The hinge 55 is operably connected with an actuator 68. A controller 70 selectively commands the actuator 68 to pivot the flap 64 about the hinge 55 to vary a cross-sectional area 72 between the flaps 64 and the bypass passage inner flow surface 29. In a closed position, the flap 64 is closer to the bypass passage inner flow surface 29 for a relatively smaller cross-sectional area 72. In an open position, the flap 64 is farther away from the bypass inner flow surface 29 for a relatively larger cross-sectional area 72.

In one example, the controller 70 selectively actuates the flaps 64 to control the nozzle cross-sectional area 72, which in turn controls the static pressure, $P_{static}$, in a pressure controlled plane 71 of the bypass passage 32 to in turn control an amount of bleed flow 48 through the cooling passage 36. For example, closing the flaps 64 reduces the cross-sectional area 72 and increases $P_{static}$, and opening the flaps 64 increases the cross-sectional area 72 and decreases $P_{static}$.

In this example, the outlet 46b of the cooling passage 36 is axially aligned with the variable area exhaust nozzle 30. Thus, the cooling passage 36 discharges the bleed flow 48 at a location substantially axially aligned with the pressure controlled plane 71. The magnitude of $P_{static}$ at the pressure controlled section 71 controls an amount of bleed flow 48 through the cooling passage 36. For example, closing the flaps 64 to reduce the cross-sectional area 72 increases $P_{static}$ (e.g., relative to air pressure near the inlet 46a). The increase in $P_{static}$ at the outlet 46b restricts the amount of bleed flow 48 through the cooling passage 36 for less of a cooling effect. Opening the flaps 64 to increase the cross-sectional area 72 reduces $P_{static}$ at the outlet 46b. This permits a relatively greater amount of bleed flow 48 through the cooling passage 36 for a greater cooling effect. In the illustrated example, the outlet 46b of the cooling passage 36 is axially aligned with the hinge 55 of the variable 30. Alignment with the hinge 55 provides the benefit of increasing, or in some examples maximizing, the effect of $P_{static}$ at the outlet 46b. For example when the flap 64 is in the most open position, $P_{static}$ at the pressure controlled plane 71 is lower than at any other axial position within the bypass passage 32. Conversely when the flap 64 is in the most closed position, $P_{static}$ at the pressure controlled plane 71 is higher than at any other axial position within the bypass passage 32.

In one example, the controller 70 selectively controls the flaps 64 of the variable area exhaust nozzle 30 during various stages of an aircraft flight to increase, or in some examples maximize, fan efficiency and stability. For example, when an aircraft is at cruise (e.g., a generally constant air speed at generally constant, elevated altitude), fan 14 efficiency and stability requires the variable area exhaust nozzle 30 to be in its most closed position. In this example, the controller 70 closes the flaps 64 to reduce cross sectional area 72 and increase $P_{static}$. This provides the benefit of reducing the amount of bleed flow 48 through the cooling passage 36. At this condition reduced bleed flow is beneficial because at the elevated altitude, the airflow through the bypass passage 32 is generally much cooler than ambient, ground air.

The controller 70 opens the flaps 64 to increase the cross-sectional area 72 during takeoff of an aircraft to provide the required operating conditions to the fan 14. At relatively low altitudes and during periods of relatively high thrust, a greater amount of bleed flow 48 through the cooling passage 36 is desired to cool the gas turbine engine component 52. In this example, the controller 70 opens the flaps 64 to reduce $P_{static}$. This provides the benefit of a greater amount of bleed flow 48 through the cooling passage 36 to cool the gas turbine engine component 52.

In the disclosed example, the ability to control the amount of bleed flow 48 provides the benefit of greater control over gas turbine engine 10 efficiency. The bleed flow through prior, unregulated cooling passages penalizes bypass airflow thrust efficiency by imparting a pressure loss to the bleed flow. This pressure loss increases with the amount of bleed flow. In an unregulated system, bypass air flow is normally used to produce jet thrust enters the bleed duct 36 and exceeds cooling the cooling requirement. However, selective reduction of the amount of bleed flow 48 reduces pressure loss of the bypass flow 48 thereby increasing efficiency.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A gas turbine engine system comprising:
an annular fan bypass passage extending between an inner flow surface and an outer flow surface relative to an engine centerline axis;
a cooling passage having an inlet for receiving a bleed flow from the annular fan bypass passage and an outlet at the inner flow surface for discharging the bleed flow into the annular fan bypass passage; and
a nozzle, disposed at an aft end of the annular fan bypass passage, having a variable cross-sectional area for controlling an airflow within the annular fan bypass passage, the nozzle including at least one flap located at the outer flow surface that pivots about a hinge that is selectively moveable to change the variable cross-sectional area thereby controlling an amount of the bleed flow through the cooling passage, wherein the outlet of the cooling passage is axially aligned with the hinge relative to the engine centerline axis.

2. The system as recited in claim 1, wherein the annular fan bypass passage includes a pressure control plane that is controlled by movement of the at least one flap of the nozzle, wherein the outlet is axially aligned with the pressure control plane.

3. The system as recited in claim 1, wherein the cooling passage includes an air-oil heat exchanger.

4. The system of claim 3, wherein the air-oil heat exchanger is in thermal communication with a gas turbine engine component.

5. The system of claim 4, wherein the gas turbine engine component is a fan drive gearbox.

6. The system of claim 4, wherein the gas turbine engine component is an electric generator.

7. The system as recited in claim 1, further comprising an actuator for selectively moving the at least one flap of the nozzle.

8. The system as recited in claim 7, further comprising a controller for selectively commanding the actuator.

9. A gas turbine engine system comprising:
a nacelle;
a gas turbine engine within the nacelle;
an annular fan bypass passage between the nacelle and the gas turbine engine;
a cooling passage having an inlet for receiving a bleed flow from the annular fan bypass passage and an outlet for discharging the bleed flow into the annular fan bypass passage; and
a nozzle, disposed at an aft end of the annular fan bypass passage, having a variable cross-sectional area for controlling an airflow within the annular fan bypass passage, the nozzle including at least one flap located at the outer flow surface that pivots about a hinge that is selectively moveable to change the variable cross-sectional area to control an amount of the bleed flow through the cooling passage, wherein the outlet of the cooling passage is axially aligned with the hinge relative to an centerline axis of the gas turbine engine.

10. The system as recited in claim 9, wherein the cooling passage includes an air-oil heat exchanger.

11. The system as recited in claim 10, further comprising an actuator for selectively moving the at least one flap of the nozzle.

12. The system as recited in claim 11, further comprising a controller for selectively commanding the actuator.

13. The system as recited in claim 9, wherein the annular fan bypass passage includes a pressure control plane that is controlled by movement of the nozzle, wherein the outlet is axially aligned with the pressure control plane.

14. A method of controlling a gas turbine engine system including an annular fan bypass passage and a cooling passage having an inlet for receiving a bleed flow from the annular fan bypass passage and an outlet for discharging the bleed flow into the annular fan bypass passage, the method comprising:
   controlling a flap at an exit of an exhaust nozzle disposed at an aft end of the annular fan bypass passage; and
   varying a pressure of a control plane that is axially aligned with the outlet and a hinge of the flap of the exhaust nozzle of the annular fan bypass passage by selectively varying a cross-sectional area of the exhaust nozzle, to change an amount of bleed flow through the cooling passage.

15. The method as recited in claim 14, further including decreasing the cross-sectional area to increase the pressure and decrease the amount of bleed flow.

16. The method as recited in claim 15, further including decreasing the cross-sectional area in response to a cruise period of generally constant airspeed and generally constant altitude of an aircraft.

17. The method as recited in claim 14, further including increasing the cross-sectional area to decrease the pressure and increase the amount of bleed flow.

18. The method as recited in claim 17, further including increasing the cross-sectional area in response to a takeoff period of an aircraft.

19. The method as recited in claim 14, further including selectively reducing the amount of bleed flow through the cooling passage in response to a cruise flight condition.

20. The method as recited in claim 14, further including selectively increasing the amount of bleed flow through the cooling passage in response to a takeoff flight condition.

21. The method as recited in claim 14, further including receiving 2% or less of the bleed flow in the cooling passage.

* * * * *